United States Patent
Lin

(10) Patent No.: US 11,350,433 B2
(45) Date of Patent: May 31, 2022

(54) INFORMATION TRANSMISSION METHOD AND RELATED PRODUCT

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 189 days.

(21) Appl. No.: 16/644,533

(22) PCT Filed: Sep. 5, 2017

(86) PCT No.: PCT/CN2017/100545
§ 371 (c)(1),
(2) Date: Mar. 5, 2020

(87) PCT Pub. No.: WO2019/047019
PCT Pub. Date: Mar. 14, 2019

(65) Prior Publication Data
US 2020/0196333 A1    Jun. 18, 2020

(51) Int. Cl.
*H04W 72/12* (2009.01)
*H04W 8/24* (2009.01)
*H04W 72/04* (2009.01)

(52) U.S. Cl.
CPC ......... *H04W 72/1268* (2013.01); *H04W 8/24* (2013.01); *H04W 72/0446* (2013.01); *H04W 72/1289* (2013.01)

(58) Field of Classification Search
CPC ............... H04W 72/1268; H04W 8/24; H04W 72/0446; H04W 72/1289; H04W 72/12;
(Continued)

(56) References Cited

U.S. PATENT DOCUMENTS

| 2012/0257552 A1 | 10/2012 | Chen et al. |
| 2013/0242815 A1 | 9/2013 | Wang et al. |

(Continued)

FOREIGN PATENT DOCUMENTS

| CN | 102223219 | 10/2011 |
| CN | 102263617 | 11/2011 |

(Continued)

OTHER PUBLICATIONS

FSIP, Office Action for RU Application No. 2020111016/07, dated Oct. 21, 2020.
(Continued)

*Primary Examiner* — Lan-Huong Truong
(74) *Attorney, Agent, or Firm* — Hodgson Russ LLP

(57) ABSTRACT

An information transmission method includes: receiving, by a terminal, a first downlink control signaling (DCI), the first DCI being used for scheduling the terminal to transmit uplink data through a physical uplink shared channel (PUSCH) in a target time unit; receiving, by the terminal, a second DCI, feedback response information of the second DCI being transmitted in the target time unit, and transmitting time of the second DCI being before the target time unit or the same as the target time unit; and transmitting, by the terminal according to the transmitting time of the second DCI, the feedback response information of the second DCI through the PUSCH in the target time unit.

11 Claims, 7 Drawing Sheets

(58) Field of Classification Search
CPC ............. H04W 72/1278; H04L 1/0026; H04L 1/0027; H04L 5/0044; H04L 5/0055; H04L 5/0078; H04L 1/0013; H04L 5/0053

See application file for complete search history.

(56) References Cited

U.S. PATENT DOCUMENTS

| | | | |
|---|---|---|---|
| 2013/0322398 | A1 | 12/2013 | Jang et al. |
| 2016/0044638 | A1 | 2/2016 | Gao et al. |
| 2016/0204926 | A1 | 7/2016 | Shi |
| 2016/0323852 | A1 | 11/2016 | Golitschek Edler Von Elbwart et al. |
| 2017/0230915 | A1* | 8/2017 | Kim ................. H04W 52/34 |
| 2018/0255568 | A1 | 9/2018 | Takeda et al. |
| 2018/0310257 | A1* | 10/2018 | Papasakellariou ................. H04W 72/1289 |
| 2019/0045571 | A1* | 2/2019 | Wu ................. H04W 76/15 |

FOREIGN PATENT DOCUMENTS

| | | |
|---|---|---|
| CN | 102122979 | 4/2013 |
| CN | 103563284 | 2/2014 |
| CN | 103650393 | 3/2014 |
| CN | 103944701 | 7/2014 |
| CN | 104247313 | 12/2014 |
| CN | 104640214 | 5/2015 |
| EP | 2709299 | 3/2014 |
| EP | 3101834 | 12/2016 |
| RU | 2458484 | 8/2012 |
| WO | 2012142123 A2 | 10/2012 |
| WO | 2015027798 | 3/2015 |
| WO | 2016053844 | 4/2016 |
| WO | 2017038532 | 3/2017 |

OTHER PUBLICATIONS

SIPO, First Office Action for CN Application No. 201911316050.X, dated Nov. 3, 2020.
CIPO, Office Action for CA Application No. 3074604, dated Apr. 13, 2021.
IPIN, Office Action for IN Application No. 202017010979, dated May 21, 2021.
INAPI, Office Action for CL Application No. 202000532, dated Sep. 20, 2021.
Guangdong Oppo Mobile Telecom, "Multiplexing of UCI and UL data," 3GPP TSG RAN WG1 Meeting #87, R1-1611699, Nov. 2016, 3 pages.
Guangdong Oppo Mobile Telecom, "Multiplexing of short-duration UCI and UL data," 3GPP TSG RAN WG1 Meeting #90, R1-1713276, Aug. 2017, 3 pages.
Samsung, "Handling collisions between n+4 and n+3," 3GPP TSG RAN WG1 Meeting #88bis, R1-1705273, Apr. 2017, 3 pages.
Huawei et al., "UCI piggyback on Pusch," 3GPP TSG RAN WG1 Meeting #90, R1-1712195, Aug. 2017, 5 pages.
Mediatek Inc., "Discussion on UCI on PUSCH," 3GPP TSG RAN WG1 Meeting #90, R1-1713702, Aug. 2017, 3 pages.
JPO, Office Action for JP Application No. 2020-513322, dated Aug. 3, 2021.
IPOS, Office Action for SG Application No. 11202001918V, dated Sep. 23, 2021.
Ericsson, "Summary of 7.3.3.1 (resource allocation)," TSG-RAN WG1 AdHoc 1801, R1-1801011, Jan. 2018, 14 pages.
Mediatek Inc., "Discussion on multiplexing of PUCCH and PUSCH," 3GPP TSG RAN WG1 NR Ad-Hoc#2, R1-1710821, Jun. 2017, 4 pages.
Nokia et al., "On the multiplexing between PUCCHs and PUSCH," 3GPP TSG RAN WG1 NR Ad-Hoc #2, R1-1710900, Jun. 2017, 4 pages.
"3rd Generation Partnership Project; Technical Specification Group Radio Access Network; NR; Physical layer procedures for control (Release 15)," 3GPP TS 38.213, Dec. 2017, v15.0.0, 56 pages.
EPO, Office Action for EP Application No. 17924573.3, dated Jul. 7, 2020.
WIPO, ISR for PCT/CN2017/100545, Jun. 6, 2018.
EPO, Extended European Search Report for EP Application No. 21195772.5, dated Dec. 14, 2021.
KIPO, Office Action for KR Application No. 10-2020-7006951, dated Jan. 12, 2022.
EPO, Communication of a Notice of Opposition issued in EP Application No. 17924573.3, dated Mar. 30, 2022.
Huawei, 3GPP TSG RAN WG1, Ad Hoc Meeting, R1-1709970, "HARQ Feedback Timing for NR", Jun. 2017.
MediaTek Inc., 3GPP TSG RAN WG1, Meeting #90, R1-17013977, "UE Processing Time Evaluation", Aug. 2017.
Intel Corporation, 3GPP TSG RAN WG1, Meeting #90, R1-1712598, "Processing Times and HARQ Processes in NR", Aug. 2017.
Vivo, 3GPP TSG RAN WG1, 90 Meeting, R1-1712859, "Discussion on UCI Piggyback to PUSCH", Aug. 2017.
MediaTek Inc., 3GPP TSG RAN WG1 NR, Ad-Hoc#2, R1-1710820, "Discussion on UCI on PUSCH", Jun. 2017.
Samsung, 3GPP TSG RAN WG1, #90, R1-1713632, "On UCI Multiplexing in PUSCH", Aug. 2017.

* cited by examiner

INFORMATION TRANSMISSION METHOD AND RELATED PRODUCT

CROSS-REFERENCE TO RELATED APPLICATION

This application is a U.S. national phase application of International Application No. PCT/CN2017/100545, filed Sep. 5, 2017, the entire disclosure of which is incorporated herein by reference.

TECHNICAL FIELD

The present disclosure relates to the field of communication, and more particularly, to an information transmission method and a related product.

BACKGROUND

In the long term evolution (LTE) system of the 3rd Generation Partnership Project (3GPP), the uplink physical channel is mainly composed of channels such as a physical uplink control channel (PUCCH) and a physical uplink share channel (PUSCH). The PUCCH channel is used for transmitting separate uplink control information, and the PUSCH channel can be used for simultaneously transmitting uplink shared channel data and uplink control information.

SUMMARY

Implementation of the disclosure provide an information transmission method and a related product, so as to implement UCI transmission through PUSCH multiplexing, thereby improving the accuracy and stability of data scheduling of the communication system.

According to a first aspect of implementation of the disclosure, there is provided a method for transmitting information, including:

receiving, by a terminal, a first downlink control information (DCI), the first DCI being used for scheduling the terminal to transmit uplink data through a physical uplink shared channel (PUSCH) in a target time unit;

receiving, by the terminal, a second DCI, feedback response information of the second DCI being transmitted in the target time unit, and transmission time of the second DCI being before the target time unit or the same as the target time unit; and determining, by the terminal according to the transmission time of the second DCI, to transmit the feedback response information of the second DCI through the PUSCH in the target time unit.

According to a second aspect of implementation of the disclosure, there is provided a method for transmitting information, including:

transmitting, by a network device, a first downlink control information (DCI), the first DCI being used for scheduling a terminal to transmit uplink data through a physical uplink shared channel (PUSCH) in a target time unit;

transmitting, by the network device, a second DCI, feedback response information of the second DCI being transmitted in the target time unit, and transmission time of the second DCI being before the target time unit or the same as the target time unit; and determining, by the network device according to the transmission time of the second DCI, to receive the feedback response information of the second DCI through the PUSCH in the target time unit.

According to a third aspect of implementation of the disclosure, there is provided a terminal having a function of implementing actions of the terminal described in the foregoing method. The functions may be implemented by hardware or by corresponding software executed using hardware. The hardware or software includes one or more modules corresponding to the functions described above. In a possible implementation, the terminal includes a processor configured to support the terminal in performing the corresponding functions of the above methods. In addition, the terminal may further include a transceiver for supporting communication between the terminal and the network device. Moreover, the terminal may further include a memory coupled with the processor and used for storing program instructions and data necessary for the terminal.

According to a fourth aspect of implementation of the disclosure, there is provided a network device having a function of implementing actions of the network device described in the foregoing method. The functions may be implemented by hardware or by corresponding software executed using hardware. The hardware or software includes one or more modules corresponding to the functions described above. In a possible implementation, the network device includes a processor configured to support the network device in performing the corresponding functions of the above methods. In addition, the network device may further include a transceiver for supporting communication between the network device and the terminal. Moreover, the network device may further include a memory coupled with the processor and used for storing program instructions and data necessary for the network device.

According to a fifth aspect of implementation of the disclosure, there is provided a terminal including: a processor, a memory, a communication interface, and one or more programs, the one or more programs being stored in the memory and configured to be executed by the processor, wherein the one or more programs include instructions used for performing actions in any method according to the first aspect of implementation of the disclosure.

According to a sixth aspect of implementation of the disclosure, there is provided a network device including: a processor, a memory, a communication interface, and one or more programs, the one or more programs being stored in the memory and configured to be executed by the processor, wherein the one or more programs include instructions used for performing actions in any method according to the second aspect of implementation of the disclosure.

According to a seventh aspect of implementation of the disclosure, there is provided a computer readable storage medium storing a computer program used for electronic data exchange, wherein the computer program causes a computer to perform part or all of actions described in the method according to the first aspect of implementation of the disclosure.

According to an eighth aspect of implementation of the disclosure, there is provided a computer readable storage medium storing a computer program used for electronic data exchange, wherein the computer program causes a computer to perform part or all of actions described in the method according to the second aspect of implementation of the disclosure.

According to a ninth aspect of implementation of the disclosure, there is provided a computer program product, wherein the computer program product includes a non-transitory computer readable storage medium storing a computer program, the computer program being operative to cause a computer to perform part or all of actions described in the method according to the first aspect of implementation of the disclosure. The computer program product may be a software installation package.

According to a tenth aspect of implementation of the disclosure, there is provided a computer program product, wherein the computer program product includes a non-transitory computer readable storage medium storing a computer program, the computer program being operative to cause a computer to perform part or all of actions described in the method according to the second aspect of implementation of the disclosure. The computer program product may be a software installation package.

It is to be noted that, according to implementation of the disclosure, the terminal firstly receives the first DCI, which is used for scheduling the terminal to transmit uplink data through PUSCH in the target time unit; secondly, receives the second DCI, feedback response information of which is transmitted in the target time unit, and transmission time of which is before or the same as the target time unit; and finally determines, according to the transmission time of the second DCI, that the feedback response information of the second DCI is transmitted through PUSCH in the target time unit. The transmission time of the second DCI can be used for determining the feedback response information and the PUSCH multiplex transmission, so as to accurately multiplex and transmit the feedback response information through the PUSCH, thereby avoiding such a situation that the network device cannot perform accurate data scheduling as being unable to accurately identify information (such as number) of the feedback response information, and improving the accuracy and stability of data scheduling in the communication system.

BRIEF DESCRIPTION OF THE DRAWINGS

The drawings used in description of the implementation or the related art will be briefly described below.

DETAILED DESCRIPTION

First, some concepts and general operation manners involved in implementation of the disclosure will be briefly explained.

The 5th-generation of mobile communication technology (5G) new radio (NR) is a newly proposed topic in the 3rd generation partnership project (3GPP) organization. As the discussion of the new generation of 5G technology gradually deepens, on the one hand, because the communication system is backward compatible, the new technology developed later tends to be compatible with the previously standardized technology; on the other hand, because the 4G LTE system already proposes a large number of existing solutions, in order to achieve compatibility, it has to sacrifice a lot of flexibility of 5G to reduce performance. Therefore, there are currently two parallel studies in the 3GPP organization, the backward-compatible is not considered by one of the technical discussion groups, which is called 5G NR.

Figure 1:
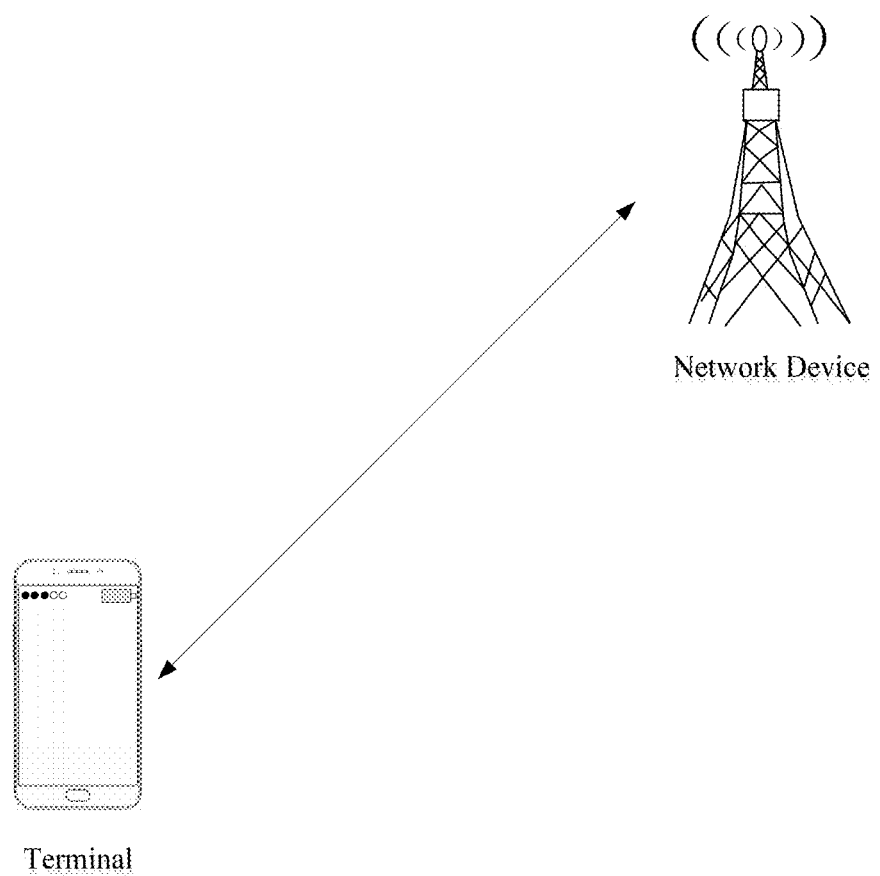
FIG. 1 is an exemplary network architecture diagram of a communication system according to an implementation of the disclosure.

Currently, in the research process of the 5G NR system, for a terminal that does not support simultaneous transmission of PUCCH and PUSCH, when the terminal needs to simultaneously transmit the uplink control information (UCI) and PUSCH in one subframe, the UCI needs to be transmitted through the PUSCH. For periodic UCI information, the base station and the terminal can accurately predict the capacity and transmission time of the feedback information, so that reasonable resource scheduling can be performed to ensure the transmission performance of the PUSCH and the UCI. However, for acknowledgment/non-acknowledgment (ACK/NACK) information, since the NR supports flexible scheduling/HARQ timing, the base station cannot accurately predict the ACK/NACK feedback when transmitting the uplink grant UL grant (PUCCH). As shown in FIG. 1, the terminal receives the first downlink control information (DCI) in the time unit n, the first DCI being used for scheduling terminal to transmit the PUSCH in the time unit n+k; the terminal receives the second downlink control information in the time unit m1, the first feedback response information corresponding to the second downlink control information is transmitted in the time unit n+k; and the terminal receives the third downlink control information in the time unit m2, the second feedback response information corresponding to the third downlink control information is transmitted in the time unit n+k. Since the base station supports flexible scheduling/HARQ timing, the base station cannot accurately predict the feedback situation such as the number of the first feedback response information and the number of the second feedback response information, and thus cannot implement accurate scheduling. In this case, there is no clear solution on how to achieve efficient UCI multiplexing transmission.

As to the above problem, implementation of the present disclosure provides an information transmission method and related products. The method includes following actions. The terminal firstly receives the first DCI, which is used for scheduling the terminal to transmit uplink data through PUSCH in the target time unit; secondly, receives the second DCI, feedback response information of which is transmitted in the target time unit, and transmission time of which is before or the same as the target time unit; and finally determines, according to the transmission time of the second DCI, that the feedback response information of the second DCI is transmitted through PUSCH in the target time unit. The transmission time of the second DCI can be used for determining the feedback response information and the PUSCH multiplex transmission, so as to accurately multiplex and transmit the feedback response information through the PUSCH, thereby avoiding such a situation that the network device cannot perform accurate data scheduling as being unable to accurately identify information (such as number) of the feedback response information, and improving the accuracy and stability of data scheduling in the communication system.

The technical solutions in the implementation of the disclosure will be described below with reference to the accompanying drawings.

Please refer to FIG. 1. FIG. 1 is an exemplary network architecture diagram of a communication system according to an implementation of the disclosure. The exemplary communication system can be, for example, a 5G NR system and other such communication systems. The exemplary communication system specifically includes a network device and a terminal. When the terminal accesses the mobile communication network provided by the network device, the terminal and the network device can be communication connected by using a wireless link, and the communication connection may be in a single connection mode, a dual connection mode, or a multiple connection mode. When the communication connection is in the single connection mode, the network device may be an LTE base station or an NR base station (also referred to as a gNB base station). When the communication connection is in the dual connection mode, which may be specifically implemented by carrier aggregation (CA) technology or by a plurality of network devices, and the terminal is connected to multiple network devices, the multiple network devices may include a master cell group (MCG) and a secondary cell group (SCG), and the base stations may perform data backhaul through the backhaul link. The MCG may include an LTE base station, and the SCG may include an LTE base station. Alternatively, the MCG may include an NR base station, and the SCG may include an LTE base station. Alternatively, the MCG may include an NR base station, and the SCG may include an NR base station.

In the implementation of the disclosure, the terms "network" and "system" are often used interchangeably, and those skilled in the art can understand the meaning thereof. The terminals involved in the implementation of the disclosure may include various handheld devices, in-vehicle devices, wearable devices, computing devices, or other processing devices connected to the wireless modem, and various forms of user equipment (UE), mobile station (MS), terminal device, and the like. For convenience of description, the devices mentioned above are collectively referred to as the terminal.

Figure 2:
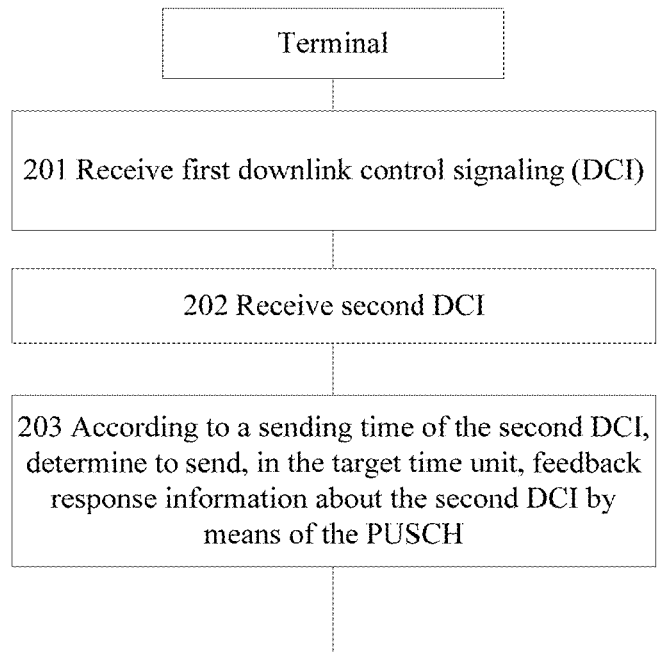
FIG. 2 is a schematic flowchart of an information transmission method according to an implementation of the disclosure.

Referring to FIG. 2, FIG. 2 illustrates an information transmission method according to an implementation of the disclosure, which is applied to the foregoing exemplary communication system, and the method includes following actions.

In block 201, the terminal receives a first downlink control information (DCI), the first DCI being used for scheduling the terminal to transmit uplink data in a target time unit through a physical uplink shared channel (PUSCH).

In an implementation, the time unit may be a time domain transmission unit such as a subframe, a time slot, or a symbol.

In block 202, the terminal receives a second DCI, feedback response information of the second DCI being transmitted in the target time unit, and transmission time of the second DCI being before the target time unit or the same as the target time unit.

In block 203, the terminal determines, according to the transmission time of the second DCI, to transmit the feedback response information of the second DCI through the PUSCH in the target time unit.

It can be seen that, in this implementation of the disclosure, the terminal firstly receives the first DCI, which is used for scheduling the terminal to transmit uplink data through PUSCH in the target time unit; secondly, receives the second DCI, feedback response information of which is transmitted in the target time unit, and transmission time of which is before or the same as the target time unit; and finally determines, according to the transmission time of the second DCI, that the feedback response information of the second DCI is transmitted through PUSCH in the target time unit. The transmission time of the second DCI can be used for determining the feedback response information and the PUSCH multiplex transmission, so as to accurately multiplex and transmit the feedback response information through the PUSCH, thereby avoiding such a situation that the network device cannot perform accurate data scheduling as being unable to accurately identify information (such as number) of the feedback response information, and improving the accuracy and stability of data scheduling in the communication system.

In a possible example, the determining, by the terminal according to the transmission time of the second DCI, to transmit the feedback response information of the second DCI through the PUSCH in the target time unit includes: determining, by the terminal, that the transmission time of the second DCI is before or the same as the transmission time of the first DCI; performing, by the terminal, rate matching on the uplink data scheduled by the first DCI according to a number of bits of the feedback response information of the second DCI or resource occupied by the feedback response information of the second DCI; and transmitting, by the terminal through the PUSCH, the feedback response information of the second DCI and the uplink data being rate matched.

In an implementation, the rate matching refers to determining the number of bits after data encoding according to the number of bits of the UCI or the number of resource occupied by the UCI.

It can be seen that in this example, the network device can accurately predict the number of bits of the coded data after the rate matching, so that the data scheduling can be accurately performed, such as selecting the appropriate resource number and modulation code level.

In a possible example, the determining, by the terminal according to the transmission time of the second DCI, to transmit the feedback response information of the second DCI through the PUSCH in the target time unit includes: determining, by the terminal, that the transmission time of the second DCI is after the transmission time of the first DCI; and multiplexing, by the terminal, the feedback response information of the second DCI into the PUSCH in a puncturing manner for transmission.

In an implementation, the puncturing manner refers to mapping the encoded data to the entire PUSCH resource. After determining the physical resource occupied by the UCI, the terminal may directly puncture the data symbols to be transmitted and replaces them with UCI symbols. When the number of UCI information is large, continuously deleting a large number of data symbols may affect the data demodulation performance.

It can be seen that, in this example, the network device does not reserve resource for the feedback response information, and uses the puncturing manner to perform multiplexing transmission when the feedback response information occurs, so as to avoid waste of resource.

In a possible example, the second DCI includes a plurality of DCIs, each DCI has feedback response information; and the determining, by the terminal according to the transmission time of the second DCI, to transmit the feedback response information of the second DCI through the PUSCH in the target time unit includes: determining, by the terminal, that a transmission time of at least one of the plurality of DCIs is after the transmission time of the first DCI; and multiplexing, by the terminal, the feedback response information of the plurality of DCIs into the PUSCH in a puncturing manner for transmission.

It can be seen that, in this example, when transmission time of any one of the multiple DCIs is after the transmission time of the first DCI, all the feedback response information is uniformly processed to avoid increasing implementation complexity caused by using different multiplexing manners for different feedback response information.

In a possible example, the determining, by the terminal according to the transmission time of the second DCI, to transmit the feedback response information of the second DCI through the PUSCH in the target time unit includes: determining, by the terminal, a time interval between the transmission time of the second DCI and the target time unit or between the transmission time of the second DCI and a starting position of the PUSCH; and determining, by the terminal according to the time interval, to transmit the feedback response information of the second DCI through the PUSCH in the target time unit.

In this possible example, the determining, by the terminal according to the time interval, to transmit the feedback response information of the second DCI through the PUSCH in the target time unit includes: determining, by the terminal, that the time interval is not less than a preset time interval, performing rate matching on the uplink data scheduled by the first DCI according to a number of bits of the feedback response information of the second DCI or resource occupied by the feedback response information of the second DCI; and transmitting, by the terminal through the PUSCH, the feedback response information of the second DCI and the uplink data being rate matched.

In an implementation, the value of the preset time interval is determined by a preset protocol, or the value of the preset time interval is configured by the network device, and is not limited herein. The preset time interval is a minimum processing delay of the uplink scheduling supported by the terminal.

It can be seen that, in this example, when the time interval is not less than the preset time interval, the network device can accurately predict the number of bits of the coded data after the rate matching, so that the data scheduling can be accurately performed, such as selecting the appropriate resource number and modulation code level.

In this possible example, the determining, by the terminal according to the time interval, to transmit the feedback response information of the second DCI through the PUSCH in the target time unit includes: determining, by the terminal, that the time interval is less than a preset time interval, and multiplexing the feedback response information of the second DCI into the PUSCH in a puncturing manner for transmission.

It can be seen that, in this example, when the time interval is less than the preset time interval, the terminal cannot complete the rate matching processing on the data according to the number of the feedback response information or the resource occupied by the feedback response information, and therefore needs to perform the puncturing process, which is beneficial to improve stability and real-time performance of the scheduling.

In a possible example, the second DCI includes a plurality of DCIs, each DCI has feedback response information; and the determining, by the terminal according to the transmission time of the second DCI, to transmit the feedback response information of the second DCI through the PUSCH in the target time unit includes: determining, by the terminal, that a time interval between a transmission time of at least one of the plurality of DCIs and the target time unit or between the transmission time of at least one of the plurality of DCIs and a starting position of the PUSCH is less than a preset time interval; and multiplexing, by the terminal, the feedback response information of the plurality of DCIs into the PUSCH in a puncturing manner for transmission.

It can be seen that, in this example, when transmission time of any one of the multiple DCIs is after the transmission time of the first DCI, all the feedback response information is uniformly processed to avoid increasing implementation complexity caused by using different multiplexing manners for different feedback response information.

In a possible example, the method further includes: transmitting, by the terminal, the preset time interval to a network device; or transmitting, by the terminal, information of terminal capability to the network device, the information of terminal capability including the preset time interval.

Figure 3:
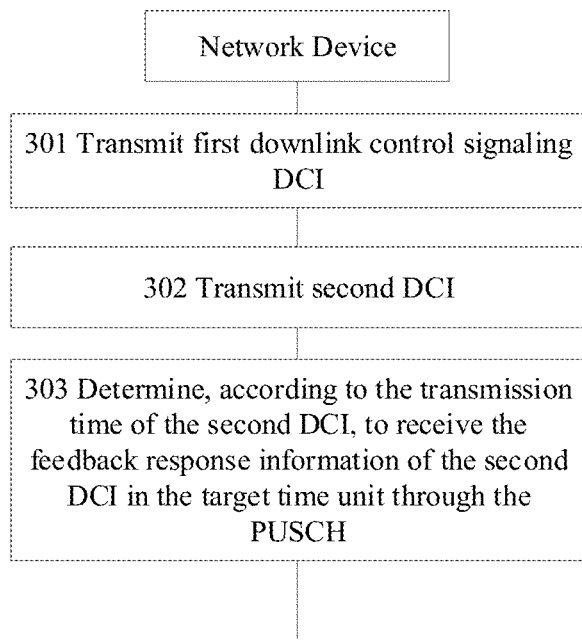
FIG. 3 is a schematic flowchart of another information transmission method according to an implementation of the disclosure.

In accordance with the implementation as shown in FIG. 2, now referring to FIG. 3, which illustrates an information transmission method according to an implementation of the disclosure. The method is applied to the foregoing exemplary communication system and includes following actions.

In block 301, the network device transmits a first downlink control information (DCI), the first DCI being used for scheduling a terminal to transmit uplink data in a target time unit through a physical uplink shared channel (PUSCH).

In block 302, the network device transmits a second DCI, feedback response information of the second DCI being transmitted in the target time unit, and transmission time of the second DCI being before the target time unit or the same as the target time unit.

In block 303, the network device determines, according to the transmission time of the second DCI, to receive the feedback response information of the second DCI through the PUSCH in the target time unit.

It can be seen that, in this implementation of the disclosure, the network firstly transmits the first DCI, which is used for scheduling the terminal to transmit uplink data through PUSCH in the target time unit; secondly, transmits the second DCI, feedback response information of which is transmitted in the target time unit, and transmission time of which is before or the same as the target time unit; and finally determines, according to the transmission time of the second DCI, to receive the feedback response information of the second DCI through PUSCH in the target time unit. The transmission time of the second DCI can be used for determining the feedback response information and the PUSCH multiplex transmission, so as to accurately multiplex and transmit the feedback response information through the PUSCH, thereby avoiding such a situation that the network device cannot perform accurate data scheduling as being unable to accurately identify information (such as number) of the feedback response information, and improving the accuracy and stability of data scheduling in the communication system.

In a possible example, the determining, by the network device according to the transmission time of the second DCI, to receive the feedback response information of the second DCI through the PUSCH in the target time unit includes: determining, by the network device, that the transmission time of the second DCI is after or the same as the transmission time of the first DCI; performing, by the network device, rate de-matching on the uplink data scheduled by the first DCI according to a number of bits of the feedback response information of the second DCI or resource occupied by the feedback response information of the second DCI; and demodulating, by the network device, the uplink data and the feedback response information of the second DCI.

It can be seen that in this example, the network device can accurately predict the number of bits of the coded data after the rate matching, so that the data scheduling can be accurately performed, such as selecting the appropriate resource number and modulation code level.

In a possible example, the determining, by the network device according to the transmission time of the second DCI, to receive the feedback response information of the second DCI through the PUSCH in the target time unit includes: determining, by the network device, that the transmission time of the second DCI is after the transmission time of the first DCI; determining, by the network device, that the feedback response information of the second DCI is multiplexed into the PUSCH in a puncturing manner for transmission; and demodulating, by the network device, the uplink data and the feedback response information of the second DCI.

It can be seen that, in this example, the network device does not reserve resource for the feedback response information, and uses the puncturing manner to perform multiplexing transmission when the feedback response information occurs, so as to avoid waste of resource.

In a possible example, the second DCI includes a plurality of DCIs, each DCI having feedback response information; and the determining, by the network device according to the transmission time of the second DCI, to receive the feedback response information of the second DCI through the PUSCH in the target time unit includes: determining, by the network device, that a transmission time of at least one of the plurality of DCIs is after the transmission time of the first DCI; determining, by the network device, that the feedback response information of the plurality of DCIs is multiplexed into the PUSCH in a puncturing manner for transmission; and demodulating, by the network device, the uplink data and the feedback response information of the plurality of DCIs.

It can be seen that, in this example, when transmission time of any one of the multiple DCIs is after the transmission time of the first DCI, all the feedback response information is uniformly processed to avoid increasing implementation complexity caused by using different multiplexing manners for different feedback response information.

In a possible example, the determining, by the network device according to the transmission time of the second DCI, to receive the feedback response information of the second DCI through the PUSCH in the target time unit includes: determining, by the network device, a time interval between the transmission time of the second DCI and the target time unit or between the transmission time of the second DCI and a starting position of the PUSCH; and determining, by the network device according to the time interval, to receive the feedback response information of the second DCI through the PUSCH in the target time unit.

In the possible example, the determining, by the network device according to the time interval, to receive the feedback response information of the second DCI through the PUSCH in the target time unit includes: determining, by the network device, that the time interval is not less than a preset time interval, performing rate de-matching on the uplink data scheduled by the first DCI according to a number of bits of the feedback response information of the second DCI or resource occupied by the feedback response information of the second DCI; and demodulating, by the network device, the uplink data and the feedback response information of the second DCI.

It can be seen that, in this example, when the time interval is not less than the preset time interval, the network device can accurately predict the number of bits of the coded data after the rate matching, so that the data scheduling can be accurately performed, such as selecting the appropriate resource number and modulation code level.

In the possible example, the determining, by the network device according to the time interval, to receive the feedback response information of the second DCI through the PUSCH in the target time unit includes: determining, by the network device, that the time interval is less than a preset time interval, and determining that the feedback response information of the second DCI is multiplexed into the PUSCH in a puncturing manner for transmission; and demodulating, by the network device, the uplink data and the feedback response information of the second DCI.

It can be seen that, in this example, when the time interval is less than the preset time interval, the terminal cannot complete the rate matching processing on the data according to the number of the feedback response information or the resource occupied by the feedback response information, and therefore needs to perform the puncturing process, which is beneficial to improve stability and real-time performance of the scheduling.

In a possible example, the second DCI includes a plurality of DCIs, each DCI having feedback response information; the determining, by the network device according to the transmission time of the second DCI, to transmit the feedback response information of the second DCI through the PUSCH in the target time unit includes: determining, by the network device, that a time interval between a transmission time of at least one of the plurality of DCIs and the target time unit or between the transmission time of at least one of the plurality of DCIs and a starting position of the PUSCH is less than a preset time interval; determining, by the network device, that the feedback response information of the plurality of DCIs is multiplexed into the PUSCH in a puncturing manner for transmission; and demodulating, by the network device, the uplink data and the feedback response information of the plurality of DCIs.

It can be seen that, in this example, when transmission time of any one of the multiple DCIs is after the transmission time of the first DCI, all the feedback response information is uniformly processed to avoid increasing implementation complexity caused by using different multiplexing manners for different feedback response information.

In a possible example, the method further includes: receiving, by the network device, the preset time interval from the terminal; or receiving, by the network device, information of terminal capability from the terminal, the information of terminal capability including the preset time interval.

Figure 4A:
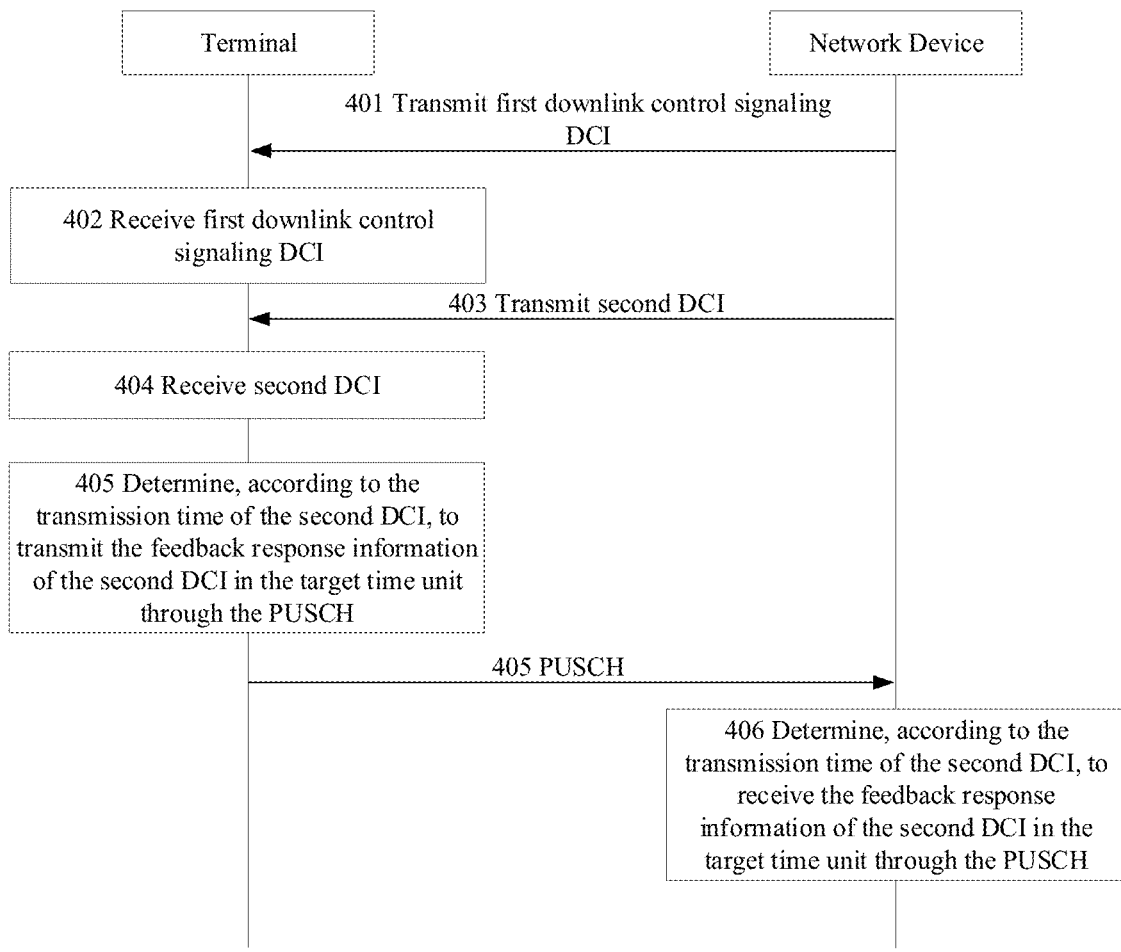
FIG. 4A is a schematic flowchart of another information transmission method according to an implementation of the disclosure.

In accordance with the implementation as shown in FIG. 2 and FIG. 3, now referring to FIG. 4A, which illustrates a method for transmitting information according to an implementation of the disclosure. The method is applied to the above exemplary communication system and includes following actions.

In block 401, the network device transmits a first downlink control information (DCI), the first DCI being used for scheduling the terminal to transmit uplink data in a target time unit through a physical uplink shared channel (PUSCH).

In block 402, the terminal receives the first downlink control information (DCI), the first DCI being used for scheduling the terminal to transmit uplink data in a target time unit through a physical uplink shared channel (PUSCH).

In block 403, the network device transmits a second DCI, feedback response information of the second DCI being transmitted in the target time unit, and transmission time of the second DCI being before the target time unit or the same as the target time unit.

In block 404, the terminal receives the second DCI, feedback response information of the second DCI being transmitted in the target time unit, and transmission time of the second DCI being before the target time unit or the same as the target time unit.

In block 405, the terminal determines, according to the transmission time of the second DCI, to transmit the feedback response information of the second DCI through the PUSCH in the target time unit.

In block 406, the network device determines, according to the transmission time of the second DCI, to receive the feedback response information of the second DCI through the PUSCH in the target time unit.

It can be seen that, in this implementation of the disclosure, the network firstly transmits the first DCI, which is used for scheduling the terminal to transmit uplink data through PUSCH in the target time unit; secondly, transmits the second DCI, feedback response information of which is transmitted in the target time unit, and transmission time of which is before or the same as the target time unit; and finally determines, according to the transmission time of the second DCI, to receive the feedback response information of the second DCI through PUSCH in the target time unit. The transmission time of the second DCI can be used for determining the feedback response information and the PUSCH multiplex transmission, so as to accurately multiplex and transmit the feedback response information through the PUSCH, thereby avoiding such a situation that the network device cannot perform accurate data scheduling as being unable to accurately identify information (such as number) of the feedback response information, and improving the accuracy and stability of data scheduling in the communication system.

The implementation of the disclosure are further described below in conjunction with specific application scenarios.

Figure 4B:
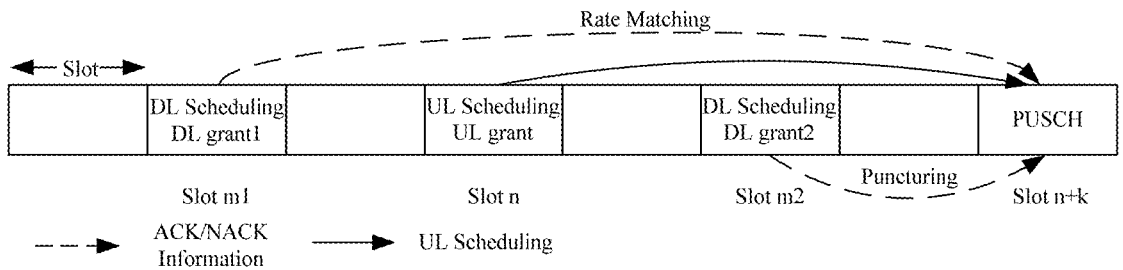
FIG. 4B illustrates an example of an information transmission method according to an implementation of the disclosure.

As shown in FIG. 4B, assuming that the terminal is a smart phone, the network device is a base station (gNB) in the 5G NR communication system, and the time unit is a time slot. The gNB transmits the first DCI to the terminal in the time slot n, and the first DCI is used for scheduling the uplink data to be transmitted in the time slot n+k through PUSCH. The gNB transmits the second DCI1 to the terminal in the time slot m1, the second DCI1 is used for downlink scheduling and its corresponding feedback response information is the ACK/NACK information. The gNB transmits the second DCI2 to the terminal in the time slot m2, the second DCI2 is used for downlink scheduling and its corresponding feedback response information is ACK/NACK information. The feedback response information of both the second DCI1 and the second DCI2 are transmitted through PUSCH in the slot n+k. After receiving the first DCI, the second DCI1, and the second DCI2, the terminal determines that the time slot m1 of the second DCI1 is before the time slot n of the first DCI and, thus, performs rate matching on the uplink data scheduled by the first DCI according to the number of bits of the feedback response information of the second DCI or the resource occupied by the feedback response information of the second DCI1. Moreover, the terminal determines that the time slot m2 of the second DCI2 is after the time slot n of the first DCI and, thus, transmits the feedback response information of the second DCI1 and the uplink data being rate matched through said PUSCH, and multiplexes the feedback response information of the second DCI into said PUSCH in a puncturing manner for transmission.

Figure 4C:
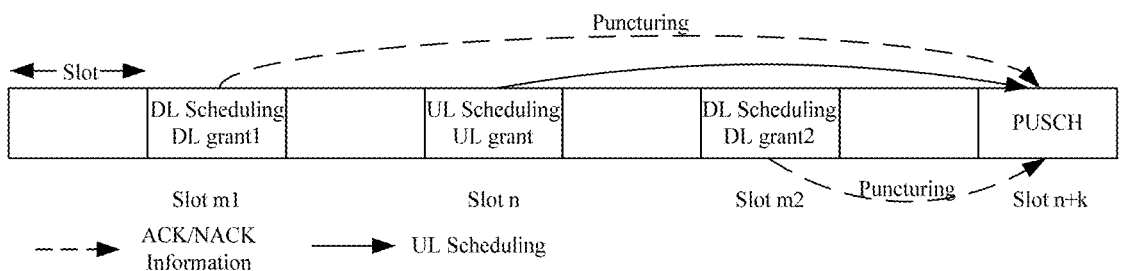
FIG. 4C illustrates another example of an information transmission method according to an implementation of the disclosure.

As shown in FIG. 4C, assuming that the terminal is a smart phone, the network device is a base station (gNB) in the 5G NR communication system, and the time unit is a time slot. The gNB transmits the first DCI to the terminal in the time slot n, and the first DCI is used for scheduling the uplink data to be transmitted in the time slot n+k through PUSCH. The gNB transmits the second DCI1 to the terminal in the time slot m1, the second DCI1 is used for downlink scheduling and its corresponding feedback response information is the ACK/NACK information. The gNB transmits the second DCI2 to the terminal in the time slot m2, the second DCI2 is used for downlink scheduling and its corresponding feedback response information is ACK/NACK information. The feedback response information of both the second DCI1 and the second DCI2 are transmitted through PUSCH in the slot n+k. After receiving the first DCI, the second DCI1, and the second DCI2, the terminal determines, among the second DCI1 and the second DCI2, that the time slot m2 of the second DCI2 is after the time slot n of the first DCI and, thus, multiplexes the feedback response information of both the second DCI1 and the second DCI 2 into the PUSCH in a puncturing manner for transmission.

Figure 4D:
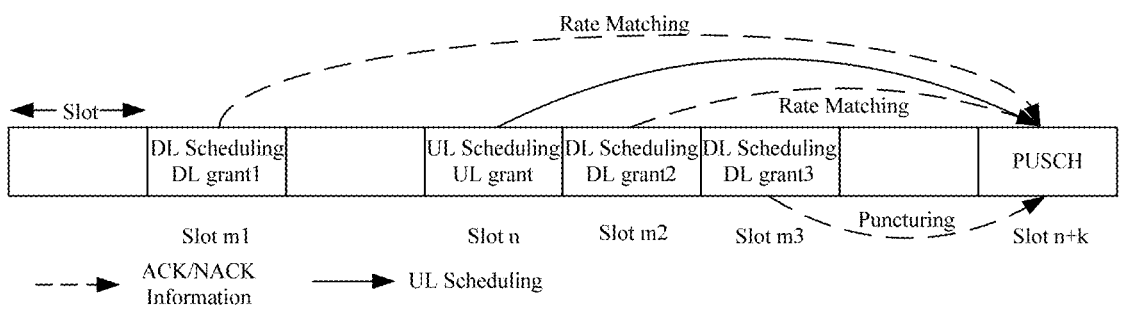
FIG. 4D illustrates another example of an information transmission method according to an implementation of the disclosure.

As shown in FIG. 4D, assuming that the terminal is a smart phone, the network device is a base station (gNB) in the 5G NR communication system, and the time unit is a time slot. The gNB transmits the first DCI to the terminal in the time slot n, and the first DCI is used for scheduling the uplink data to be transmitted in the time slot n+k through PUSCH. The gNB transmits the second DCI1 to the terminal in the time slot m1, the second DCI1 is used for downlink scheduling and its corresponding feedback response information is the ACK/NACK information. The gNB transmits the second DCI2 to the terminal in the time slot m2, the second DCI2 is used for downlink scheduling and its corresponding feedback response information is ACK/NACK information. The gNB transmits the second DCI3 to the terminal in the time slot m3, the second DCI3 is used for downlink scheduling and its corresponding feedback response information is ACK/NACK information. The feedback response information of the second DCI1, the second DCI2, and the second DCI3 are all transmitted through PUSCH in the slot n+k, and the preset time interval is 2 slots. After receiving the first DCI, the second DCI1, the second DCI2, and the second DCI3, the terminal determines that the time interval between the time slot m1 of the second DCI1 and the time slot n+k is 5 slots, the time interval between the time slot m2 of the second DCI2 and the time slot n+k is 2 slots, and the time interval between the time slot m3 of the second DCI 3 and the time slot n+k is 1 slot. Further, the terminal performs rate matching on the uplink data scheduled by the first DCI according to the number of bits of the feedback response information of the second DCI or the resource occupied by the feedback response information of the second DCI1 and the second DCI2, multiplexes the feedback response information of the second DCI3 into the PUSCH in a puncturing manner for transmission, and transmits the feedback response information of the second DCI1 and the second DCI2 as well as the uplink data being rate matched through the PUSCH.

Figure 4E:
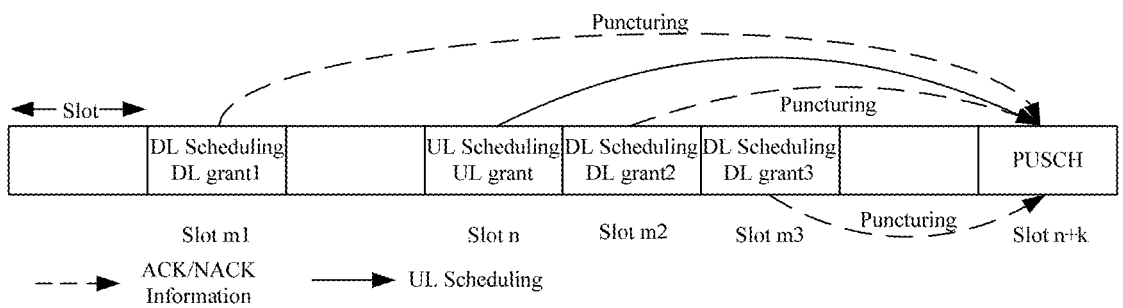
FIG. 4E illustrates another example of an information transmission method according to an implementation of the disclosure.

As shown in FIG. 4E, assuming that the terminal is a smart phone, the network device is a base station (gNB) in the 5G NR communication system, and the time unit is a time slot. The gNB transmits the first DCI to the terminal in the time slot n, and the first DCI is used for scheduling the uplink data to be transmitted in the time slot n+k through PUSCH. The gNB transmits the second DCI1 to the terminal in the time slot m1, the second DCI1 is used for downlink scheduling and its corresponding feedback response information is the ACK/NACK information. The gNB transmits the second DCI2 to the terminal in the time slot m2, the second DCI2 is used for downlink scheduling and its corresponding feedback response information is ACK/NACK information. The gNB transmits the second DCI3 to the terminal in the time slot m3, the second DCI3 is used for downlink scheduling and its corresponding feedback response information is ACK/NACK information. The feedback response information of the second DCI1, the second DCI2, and the second DCI3 are all transmitted through PUSCH in the slot n+k, and the preset time interval is 2 slots. After receiving the first DCI, the second DCI1, the second DCI2, and the second DCI3, the terminal determines, among the second DCI1, DCI2 and DCI3, the time interval between the time slot m3 of the second DCI3 and the time slot n+k is less than 2 slots and, thus, multiplexes the feedback response information of the second DCI1, the second DCI2, and the second DCI3 into the PUSCH in a puncturing manner for transmission.

Figure 5:
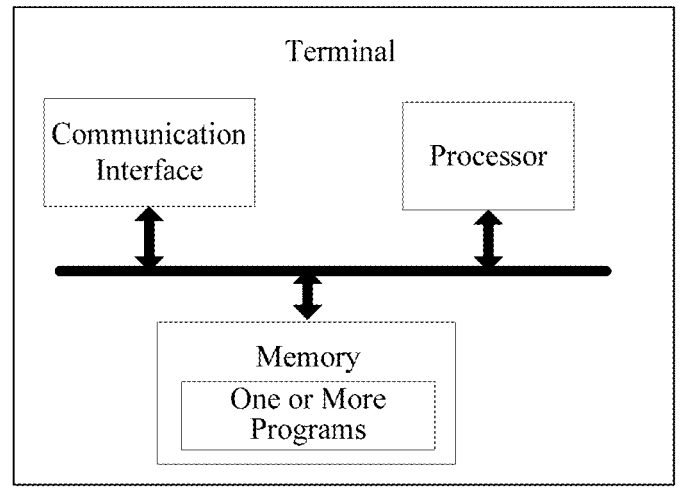
FIG. 5 is a schematic structural diagram of a terminal according to an implementation of the disclosure.

In accordance with the forgoing implementation, now referring to FIG. 5, which is a schematic structural diagram of a terminal according to an implementation of the disclosure. As shown in FIG. 5, the terminal includes a processor, a memory, a communication interface, and one or more programs. The one or more programs are stored in the memory, configured to be executed by the processor, and include instructions used for performing following actions:

receiving a first downlink control information (DCI), the first DCI being used for scheduling the terminal to transmit uplink data in a target time unit through a physical uplink shared channel (PUSCH);

receiving a second DCI, feedback response information of the second DCI being transmitted in the target time unit, and transmission time of the second DCI being before the target time unit or the same as the target time unit; and determining, according to the transmission time of the second DCI, to transmit the feedback response information of the second DCI through the PUSCH in the target time unit.

It can be seen that, in this implementation of the disclosure, the terminal firstly receives the first DCI, which is used for scheduling the terminal to transmit uplink data through PUSCH in the target time unit; secondly, receives the second DCI, feedback response information of which is transmitted in the target time unit, and transmission time of which is before or the same as the target time unit; and finally determines, according to the transmission time of the second DCI, that the feedback response information of the second DCI is transmitted through PUSCH in the target time unit. The transmission time of the second DCI can be used for determining the feedback response information and the PUSCH multiplex transmission, so as to accurately multiplex and transmit the feedback response information through the PUSCH, thereby avoiding such a situation that the network device cannot perform accurate data scheduling as being unable to accurately identify information (such as number) of the feedback response information, and improving the accuracy and stability of data scheduling in the communication system.

In a possible example, as to the action of determining, according to the transmission time of the second DCI, to transmit the feedback response information of the second DCI through the PUSCH in the target time unit, the instructions in the program are specifically used for performing following actions: determining that the transmission time of the second DCI is before or the same as the transmission time of the first DCI; performing rate matching on the uplink data scheduled by the first DCI according to a number of bits of the feedback response information of the second DCI or resource occupied by the feedback response information of the second DCI; and transmitting, through the PUSCH, the feedback response information of the second DCI and the uplink data being rate matched.

In a possible example, as to the action of determining, according to the transmission time of the second DCI, to transmit the feedback response information of the second DCI through the PUSCH in the target time unit, the instructions in the program are specifically used for performing following actions: determining that the transmission time of the second DCI is after the transmission time of the first DCI; and multiplexing the feedback response information of the second DCI into the PUSCH in a puncturing manner for transmission.

In a possible example, the second DCI includes a plurality of DCIs, each DCI has feedback response information; and as to the action of determining, according to the transmission time of the second DCI, to transmit the feedback response information of the second DCI through the PUSCH in the target time unit, the instructions in the program are specifically used for performing following actions: determining that a transmission time of at least one of the plurality of DCIs is after the transmission time of the first DCI; and multiplexing the feedback response information of the plurality of DCIs into the PUSCH in a puncturing manner for transmission.

In a possible example, as to the action of determining, by the terminal according to the transmission time of the second DCI, to transmit the feedback response information of the second DCI through the PUSCH in the target time unit, the instructions in the program are specifically used for performing following actions: determining a time interval between the transmission time of the second DCI and the target time unit or between the transmission time of the second DCI and a starting position of the PUSCH; and determining, according to the time interval, to transmit the feedback response information of the second DCI through the PUSCH in the target time unit.

In a possible example, as to the action of determining, according to the time interval, to transmit the feedback response information of the second DCI through the PUSCH in the target time unit, the instructions in the program are specifically used for performing following actions: determining that the time interval is not less than a preset time interval, performing rate matching on the uplink data scheduled by the first DCI according to a number of bits of the feedback response information of the second DCI or resource occupied by the feedback response information of the second DCI; and transmitting, through the PUSCH, the feedback response information of the second DCI and the uplink data being rate matched.

In a possible example, as to the action of determining, according to the time interval, to transmit the feedback response information of the second DCI through the PUSCH in the target time unit, the instructions in the program are specifically used for performing following actions: determining that the time interval is less than a preset time interval, and multiplexing the feedback response information of the second DCI into the PUSCH in a puncturing manner for transmission.

In a possible example, the second DCI includes a plurality of DCIs, each DCI has feedback response information; and as to the action of determining, by the terminal according to the transmission time of the second DCI, to transmit the feedback response information of the second DCI through the PUSCH in the target time unit, the instructions in the program are specifically used for performing following actions: determining that a time interval between a transmission time of at least one of the plurality of DCIs and the target time unit or between the transmission time of at least one of the plurality of DCIs and a starting position of the PUSCH is less than a preset time interval; and multiplexing the feedback response information of the plurality of DCIs into the PUSCH in a puncturing manner for transmission.

In a possible example, the program further includes instructions for performing following actions: transmitting the preset time interval to a network device; or transmitting information of terminal capability to the network device, the information of terminal capability including the preset time interval.

Figure 6:
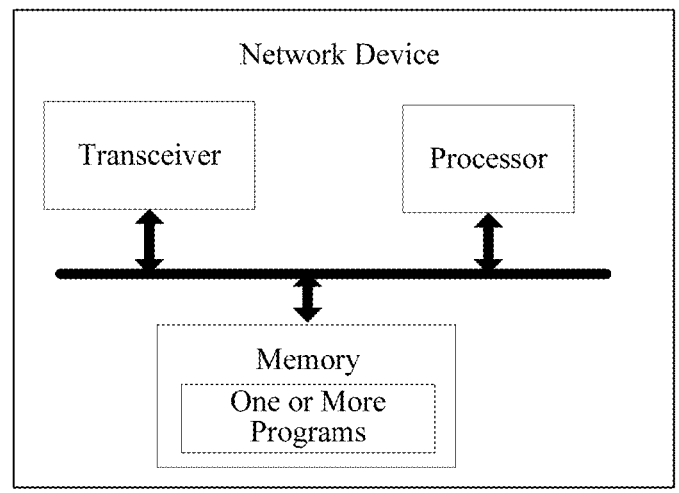
FIG. 6 is a schematic structural diagram of a network device according to an implementation of the disclosure.

In accordance with the forgoing implementation, now referring to FIG. 6, which is a schematic structural diagram of a network device according to an implementation of the disclosure. As shown in FIG. 6, the terminal includes a processor, a memory, a communication interface, and one or more programs. The one or more programs are stored in the memory, configured to be executed by the processor, and include instructions used for performing following actions:

transmitting a first downlink control information (DCI), the first DCI being used for scheduling a terminal to transmit uplink data in a target time unit through a physical uplink shared channel (PUSCH);

transmitting a second DCI, feedback response information of the second DCI being transmitted in the target time unit, and transmission time of the second DCI being before the target time unit or the same as the target time unit; and determining, according to the transmission time of the second DCI, to receive the feedback response information of the second DCI through the PUSCH in the target time unit.

It can be seen that, in this implementation of the disclosure, the network firstly transmits the first DCI, which is used for scheduling the terminal to transmit uplink data through PUSCH in the target time unit; secondly, transmits the second DCI, feedback response information of which is transmitted in the target time unit, and transmission time of which is before or the same as the target time unit; and finally determines, according to the transmission time of the second DCI, to receive the feedback response information of the second DCI through PUSCH in the target time unit. The transmission time of the second DCI can be used for determining the feedback response information and the PUSCH multiplex transmission, so as to accurately multiplex and transmit the feedback response information through the PUSCH, thereby avoiding such a situation that the network device cannot perform accurate data scheduling as being unable to accurately identify information (such as number) of the feedback response information, and improving the accuracy and stability of data scheduling in the communication system.

In a possible example, as to the action of determining, according to the transmission time of the second DCI, to receive the feedback response information of the second DCI through the PUSCH in the target time unit, the instructions in the program are specifically used for performing following actions: determining that the transmission time of the second DCI is after or the same as the transmission time of the first DCI; performing rate de-matching on the uplink data scheduled by the first DCI according to a number of bits of the feedback response information of the second DCI or resource occupied by the feedback response information of the second DCI; and demodulating the uplink data and the feedback response information of the second DCI.

In a possible example, as to the action of determining, according to the transmission time of the second DCI, to receive the feedback response information of the second DCI through the PUSCH in the target time unit, the instructions in the program are specifically used for performing following actions: determining that the transmission time of the second DCI is after the transmission time of the first DCI; determining that the feedback response information of the second DCI is multiplexed into the PUSCH in a puncturing manner for transmission; and demodulating the uplink data and the feedback response information of the second DCI.

In a possible example, the second DCI includes a plurality of DCIs, each DCI having feedback response information; and as to the action of determining, by the network device according to the transmission time of the second DCI, to receive the feedback response information of the second DCI through the PUSCH in the target time unit, the instructions in the program are specifically used for performing following actions: determining that a transmission time of at least one of the plurality of DCIs is after the transmission time of the first DCI; determining that the feedback response information of the plurality of DCIs is multiplexed into the PUSCH in a puncturing manner for transmission; and demodulating the uplink data and the feedback response information of the plurality of DCIs.

In a possible example, as to the action of determining, according to the transmission time of the second DCI, to receive the feedback response information of the second DCI through the PUSCH in the target time unit, the instructions in the program are specifically used for performing following actions: determining a time interval between the transmission time of the second DCI and the target time unit or between the transmission time of the second DCI and a starting position of the PUSCH; and determining, according to the time interval, to receive the feedback response information of the second DCI through the PUSCH in the target time unit.

In a possible example, as to the action of determining, according to the time interval, to receive the feedback response information of the second DCI through the PUSCH in the target time unit, the instructions in the program are specifically used for performing following actions: determining that the time interval is not less than a preset time interval, performing rate de-matching on the uplink data scheduled by the first DCI according to a number of bits of the feedback response information of the second DCI or resource occupied by the feedback response information of the second DCI; and demodulating the uplink data and the feedback response information of the second DCI.

In a possible example, as to the action of determining, according to the time interval, to receive the feedback response information of the second DCI through the PUSCH in the target time unit, the instructions in the program are specifically used for performing following actions: determining that the time interval is less than a preset time interval, and determining that the feedback response information of the second DCI is multiplexed into the PUSCH in a puncturing manner for transmission; and demodulating the uplink data and the feedback response information of the second DCI.

In a possible example, the second DCI includes a plurality of DCIs, each DCI having feedback response information; as to the action of determining, according to the transmission time of the second DCI, to transmit the feedback response information of the second DCI through the PUSCH in the target time unit, the instructions in the program are specifically used for performing following actions: determining that a time interval between a transmission time of at least one of the plurality of DCIs and the target time unit or between the transmission time of at least one of the plurality of DCIs and a starting position of the PUSCH is less than a preset time interval; determining that the feedback response information of the plurality of DCIs is multiplexed into the PUSCH in a puncturing manner for transmission; and demodulating the uplink data and the feedback response information of the plurality of DCIs.

In a possible example, the program further includes instructions for performing following actions: receiving the preset time interval from the terminal; or receiving information of terminal capability from the terminal, the information of terminal capability including the preset time interval.

The foregoing describes solution according to implementation of the disclosure mainly from the perspective of interaction between the network elements. It can be understood that the terminal and the network device include corresponding hardware structures and/or software modules for performing the respective functions in order to implement the above functions. Those skilled in the art will readily appreciate that the disclosure can be implemented by hardware or by hardware and computer software in combination with the elements and algorithm steps of the various examples described in the implementation disclosed herein. Whether a function is implemented in hardware or computer software driving hardware depends on the specific application and design constraints of the solution. Those skilled in the art can use different methods for each particular application to implement the described functionality, but such implementation should not be considered to be beyond the scope of the application.

The implementation of the disclosure may perform the division of functional units on the terminal and the network device according to the foregoing methods. For example, each functional unit may be divided according to each function, or two or more functions may be integrated into one processing unit. The above integrated unit can be implemented in the form of hardware or in the form of a software program module. It should be noted that the division of the unit in the implementation of the present application is schematic, and is only a logical function division. In actual implementation, there may be another division manner.

Figure 7:
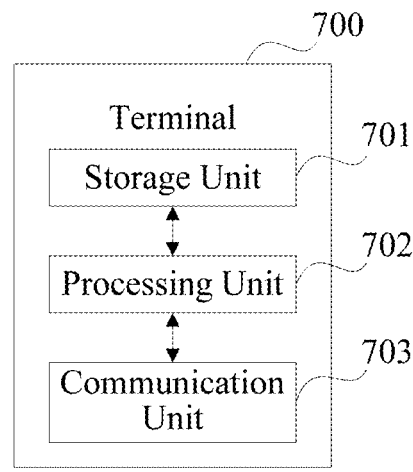
FIG. 7 is a block diagram illustrating functional units of a terminal according to an implementation of the disclosure.

In the case of employing an integrated unit, FIG. 7 illustrates a block diagram of a possible functional unit composition of the terminal involved in the above implementation. The terminal 700 includes a processing unit 702 and a communication unit 703. The processing unit 702 is configured to perform control management on the actions of the terminal. For example, the processing unit 702 is configured to support the terminal to perform steps 202-205 in FIG. 2, steps 402, 404-407 in FIG. 4A, and/or other technical processes described herein. The communication unit 703 is used for supporting communication between the terminal and other devices, such as communication with the network device shown in FIG. 6. The terminal may further include a storage unit 701 for storing program codes and data of the terminal.

In an implementation, the processing unit 702 may be a processor or a controller, and may be, for example, a central processing unit (CPU), a general-purpose processor, a digital signal processor (DSP), and an application-specific integrated circuit (ASIC), a field programmable gate array (FPGA) or other programmable logic device, transistor logic device, hardware component, or any combination thereof. It is possible to implement or carry out the various illustrative logical blocks, modules and circuits described in connection with the disclosure. The processor may also be a combination of computing functions, for example, including one or more microprocessor combinations, a combination of a DSP and a microprocessor, and the like. The communication unit 703 may be a transceiver, a transceiver circuit, or the like. The storage unit 701 may be a memory.

In an implementation, the processing unit 702 is configured to receive, via the communication unit 703, a first downlink control information (DCI), the first DCI being used for scheduling the terminal to transmit uplink data in a target time unit through a physical uplink shared channel (PUSCH); receive, via the communication unit 703, a second DCI, feedback response information of the second DCI being transmitted in the target time unit, and transmission time of the second DCI being before the target time unit or the same as the target time unit; and determine, according to the transmission time of the second DCI, to transmit the feedback response information of the second DCI through the PUSCH in the target time unit.

In a possible example, as to the action of determining, according to the transmission time of the second DCI, to transmit the feedback response information of the second DCI through the PUSCH in the target time unit, the processing unit 702 is specifically configured to: determine that the transmission time of the second DCI is before or the same as the transmission time of the first DCI; perform rate matching on the uplink data scheduled by the first DCI according to a number of bits of the feedback response information of the second DCI or resource occupied by the feedback response information of the second DCI; and transmit, through the PUSCH, the feedback response information of the second DCI and the uplink data being rate matched.

In a possible example, as to the action of determining, according to the transmission time of the second DCI, to transmit the feedback response information of the second DCI through the PUSCH in the target time unit, the processing unit 702 is specifically configured to: determine that the transmission time of the second DCI is after the transmission time of the first DCI; and multiplex the feedback response information of the second DCI into the PUSCH in a puncturing manner for transmission.

In a possible example, the second DCI includes a plurality of DCIs, each DCI has feedback response information; and as to the action of determining, according to the transmission time of the second DCI, to transmit the feedback response information of the second DCI through the PUSCH in the target time unit, the processing unit 702 is specifically configured to: determine that a transmission time of at least one of the plurality of DCIs is after the transmission time of the first DCI; and multiplex the feedback response information of the plurality of DCIs into the PUSCH in a puncturing manner for transmission.

In a possible example, as to the action of determining, by the terminal according to the transmission time of the second DCI, to transmit the feedback response information of the second DCI through the PUSCH in the target time unit, the processing unit 702 is specifically configured to: determine a time interval between the transmission time of the second DCI and the target time unit or between the transmission time of the second DCI and a starting position of the PUSCH; and determine, according to the time interval, to transmit the feedback response information of the second DCI through the PUSCH in the target time unit.

In a possible example, as to the action of determining, according to the time interval, to transmit the feedback response information of the second DCI through the PUSCH in the target time unit, the processing unit 702 is specifically configured to: determine that the time interval is not less than a preset time interval, perform rate matching on the uplink data scheduled by the first DCI according to a number of bits of the feedback response information of the second DCI or resource occupied by the feedback response information of the second DCI; and transmit, through the PUSCH, the feedback response information of the second DCI and the uplink data being rate matched.

In a possible example, as to the action of determining, according to the time interval, to transmit the feedback response information of the second DCI through the PUSCH in the target time unit, the processing unit 702 is specifically configured to: determine that the time interval is less than a preset time interval, and multiplex the feedback response information of the second DCI into the PUSCH in a puncturing manner for transmission.

In a possible example, the second DCI includes a plurality of DCIs, each DCI has feedback response information; and as to the action of determining, by the terminal according to the transmission time of the second DCI, to transmit the feedback response information of the second DCI through the PUSCH in the target time unit, the processing unit 702 is specifically configured to: determine that a time interval between a transmission time of at least one of the plurality of DCIs and the target time unit or between the transmission time of at least one of the plurality of DCIs and a starting position of the PUSCH is less than a preset time interval; and multiplex the feedback response information of the plurality of DCIs into the PUSCH in a puncturing manner for transmission.

In a possible example, the program further includes instructions for performing following actions: transmitting the preset time interval to a network device; or transmitting information of terminal capability to the network device, the information of terminal capability including the preset time interval.

When the processing unit 702 is a processor, the communication unit 703 is a communication interface, and the storage unit 701 is a memory, the terminal related to the implementation of the disclosure may be the terminal as shown in FIG. 5.

Figure 8:
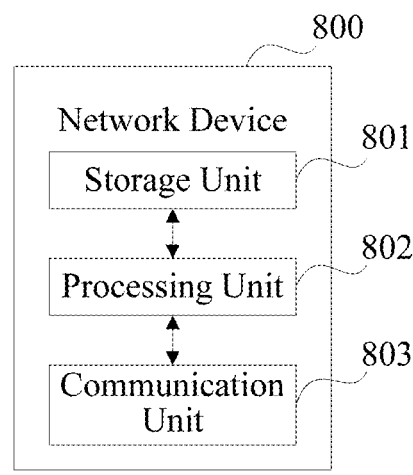
FIG. 8 is a block diagram illustrating functional units of a network device according to an implementation of the disclosure.

In the case of employing an integrated unit, FIG. 8 illustrates a block diagram of a possible functional unit composition of the network device involved in the above implementation. The network device 800 includes a processing unit 802 and a communication unit 803. The processing unit 802 is configured to perform control management on the actions of the terminal. For example, the processing unit 802 is configured to support the network device to perform steps 301-303 in FIG. 3, steps 401, 403, 408 in FIG. 4A, and/or other technical processes described herein. The communication unit 803 is used for supporting communication between the network device and other devices, such as communication with the terminal shown in FIG. 5. The network device may further include a storage unit 801 for storing program codes and data of the terminal.

In an implementation, the processing unit 802 may be a processor or a controller, the communication unit 802 may be a transceiver, a transceiver circuit, a radio frequency chip and the like, and the storage unit 801 may be a memory.

In an implementation, the processing unit 802 is configured to: transmit, via the communication unit 803, a first downlink control information (DCI), the first DCI being used for scheduling a terminal to transmit uplink data in a target time unit through a physical uplink shared channel (PUSCH); transmit, via the communication unit 803, a second DCI, feedback response information of the second DCI being transmitted in the target time unit, and transmission time of the second DCI being before the target time unit or the same as the target time unit; and determine, according to the transmission time of the second DCI, to receive the feedback response information of the second DCI through the PUSCH in the target time unit.

In a possible example, as to the action of determining, according to the transmission time of the second DCI, to receive the feedback response information of the second DCI through the PUSCH in the target time unit, the processing unit 802 is specifically configured to: determine that the transmission time of the second DCI is after or the same as the transmission time of the first DCI; perform rate de-matching on the uplink data scheduled by the first DCI according to a number of bits of the feedback response information of the second DCI or resource occupied by the feedback response information of the second DCI; and demodulate the uplink data and the feedback response information of the second DCI.

In a possible example, as to the action of determining, according to the transmission time of the second DCI, to receive the feedback response information of the second DCI through the PUSCH in the target time unit, the processing unit 802 is specifically configured to: determine that the transmission time of the second DCI is after the transmission time of the first DCI; determine that the feedback response information of the second DCI is multiplexed into the PUSCH in a puncturing manner for transmission; and demodulate the uplink data and the feedback response information of the second DCI.

In a possible example, the second DCI includes a plurality of DCIs, each DCI having feedback response information; and as to the action of determining, by the network device according to the transmission time of the second DCI, to receive the feedback response information of the second DCI through the PUSCH in the target time unit, the processing unit 802 is specifically configured to: determine that a transmission time of at least one of the plurality of DCIs is after the transmission time of the first DCI; determine that the feedback response information of the plurality of DCIs is multiplexed into the PUSCH in a puncturing manner for transmission; and demodulate the uplink data and the feedback response information of the plurality of DCIs.

In a possible example, as to the action of determining, according to the transmission time of the second DCI, to receive the feedback response information of the second DCI through the PUSCH in the target time unit, the processing unit 802 is specifically configured to: determine a time interval between the transmission time of the second DCI and the target time unit or between the transmission time of the second DCI and a starting position of the PUSCH; and determine, according to the time interval, to receive the feedback response information of the second DCI through the PUSCH in the target time unit.

In a possible example, as to the action of determining, according to the time interval, to receive the feedback response information of the second DCI through the PUSCH in the target time unit, the processing unit 802 is specifically configured to: determine that the time interval is not less than a preset time interval, perform rate de-matching on the uplink data scheduled by the first DCI according to a number of bits of the feedback response information of the second DCI or resource occupied by the feedback response information of the second DCI; and demodulate the uplink data and the feedback response information of the second DCI.

In a possible example, as to the action of determining, according to the time interval, to receive the feedback response information of the second DCI through the PUSCH in the target time unit, the processing unit 802 is specifically configured to: determine that the time interval is less than a preset time interval, and determine that the feedback response information of the second DCI is multiplexed into the PUSCH in a puncturing manner for transmission; and demodulate the uplink data and the feedback response information of the second DCI.

In a possible example, the second DCI includes a plurality of DCIs, each DCI having feedback response information; as to the action of determining, according to the transmission time of the second DCI, to transmit the feedback response information of the second DCI through the PUSCH in the target time unit, the processing unit 802 is specifically configured to: determine that a time interval between a transmission time of at least one of the plurality of DCIs and the target time unit or between the transmission time of at least one of the plurality of DCIs and a starting position of the PUSCH is less than a preset time interval; determine that the feedback response information of the plurality of DCIs is multiplexed into the PUSCH in a puncturing manner for transmission; and demodulate the uplink data and the feedback response information of the plurality of DCIs.

In a possible example, the program further includes instructions for performing following actions: receiving the preset time interval from the terminal; or receiving information of terminal capability from the terminal, the information of terminal capability including the preset time interval.

When the processing unit 802 is a processor, the communication unit 803 is a communication interface, and the storage unit 801 is a memory, the network device related to the implementation of the disclosure may be the network device as shown in FIG. 6.

Figure 9:
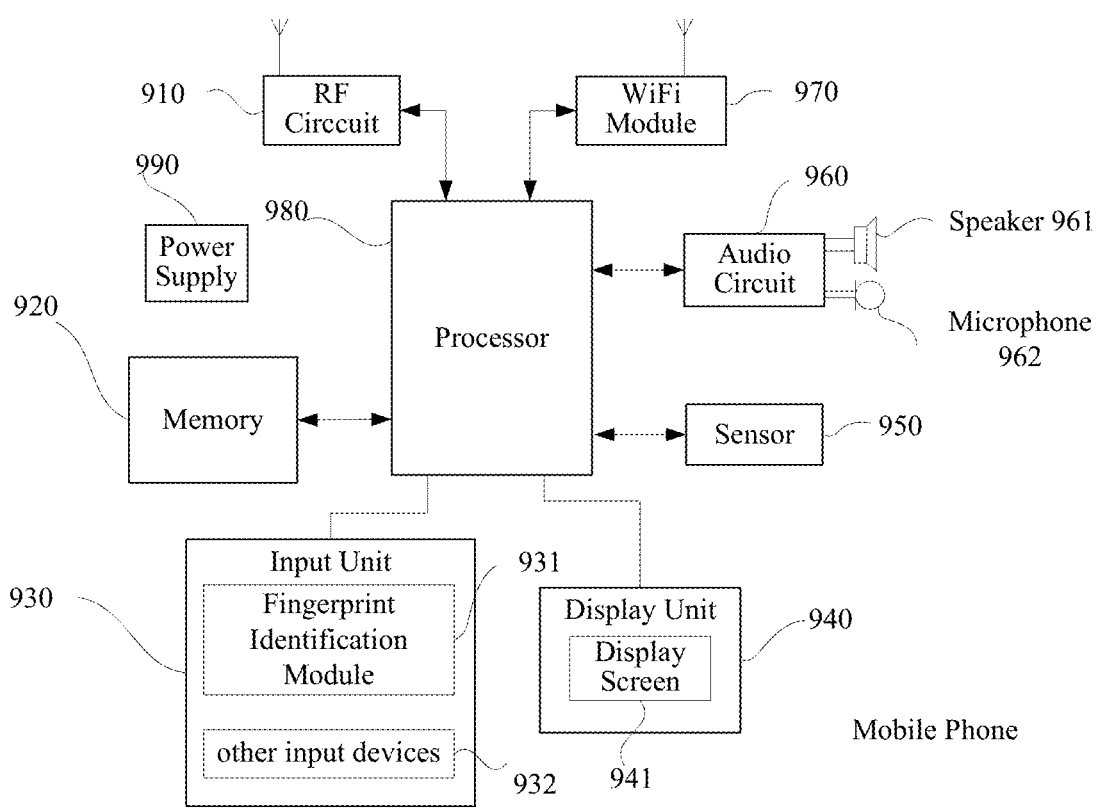
FIG. 9 is a schematic structural diagram of another terminal according to an implementation of the disclosure.

Implementation of the disclosure further provides another terminal, as shown in FIG. 9. For the convenience of description, only the part related to the implementation of the disclosure is shown. For those specific technical details not disclosed, please refer to the method implementation of the disclosure. The terminal may be any terminal device including a mobile phone, a tablet computer, a personal digital assistant (PDA), a point of sales (POS), an in-vehicle computer and the like. Following example is given as that the terminal is a mobile phone.

FIG. 9 is a block diagram illustrating a partial structure of a mobile phone according to the terminal provided by an implementation of the disclosure. Referring to FIG. 9, the mobile phone includes: a radio frequency (RF) circuit 910, a memory 920, an input unit 930, a display unit 940, a sensor 950, an audio circuit 960, a wireless fidelity (WiFi) module 970, a processor 980, a power supply 990 and other components. It will be understood by those skilled in the art that the structure of the mobile phone shown in FIG. 9 does not constitute a limitation thereto, and may include more or less components than those illustrated, or some components may be combined, or different components may be arranged.

The following describes the components of the mobile phone in detail with reference to FIG. 9.

The RF circuit 910 can be used for receiving and transmitting information. Generally, RF circuit 910 includes, but is not limited to, an antenna, at least one amplifier, a transceiver, a coupler, a low noise amplifier (LNA), a duplexer, and the like. In addition, RF circuitry 910 can also communicate with the network and other devices via wireless communication. The above wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

The memory 920 can be used for storing software programs and modules, and the processor 980 executes various functional applications and data processing of the mobile phone by running software programs and modules stored in the memory 920. The memory 920 may mainly include a program storage area and a data storage area, wherein the program storage area may store an operating system, an application required for at least one function, and the like; the data storage area may store data created according to usage of the mobile phone, and the like. Moreover, memory 920 may include a high speed random access memory, and may also include a non-volatile memory, such as at least one magnetic disk storage device, a flash memory device, or other volatile solid state storage device.

The input unit 930 may be configured to receive input numeric or character information and to generate key signal inputs related to user settings and function controls of the mobile phone. Specifically, the input unit 930 may include a fingerprint identification module 931 and other input devices 932. The fingerprint identification module 931 can collect fingerprint data of the user. In addition to the fingerprint recognition module 931, the input unit 930 may also include other input devices 932. Specifically, other input devices 932 may include, but are not limited to, one or more of a touch screen, a physical keyboard, function keys (such as volume control buttons, switch buttons, etc.), a trackball, a mouse device, a joystick, and the like.

The display unit 940 can be used for displaying information input by the user or information provided to the user as well as various menus of the mobile phone. The display unit 940 can include a display screen 941. Optionally, the display screen 941 can be configured in the form of a liquid crystal display (LCD), an organic light-emitting diode (OLED), or the like. Although the fingerprint recognition module 931 and the display screen 941 function as two separate components to implement the input and input functions of the mobile phone in FIG. 9, in some implementation, the fingerprint recognition module 931 and the display screen 941 can be integrated to achieve the input and playback functions of the mobile phone.

The mobile phone may also include at least one type of sensor 950, such as a light sensor, motion sensor, and other sensors. Specifically, the light sensor may include an ambient light sensor and a proximity sensor, wherein the ambient light sensor may adjust the brightness of the display screen 941 according to the brightness of the ambient light, and the proximity sensor may turn off the display screen 941 and/or backlight thereof when the mobile phone moves to the ear. As a kind of motion sensor, the accelerometer sensor can detect the magnitude of acceleration in all directions (usually three axes). When it is stationary, it can detect the magnitude and direction of gravity and, thus, can be used for identifying the gesture of the mobile phone (such as horizontal and vertical screen switching, related game, magnetometer attitude calibration), vibration recognition related functions (such as pedometer, tapping), and the like. The mobile phone can also be provided with gyroscopes, barometers, hygrometers, thermometers, infrared sensors and other sensors, which are not described in detail herein.

The audio circuit 960, speaker 961, and microphone 962 can provide an audio interface between the user and the mobile phone. The audio circuit 960 can transmit the converted electrical data of the received audio data to the speaker 961 for conversion to the sound signal by the speaker 961. On the other hand, the microphone 962 converts the collected sound signal into electrical signals, which are received by the audio circuit 960 and converted into audio data; then, the audio data is processed by the audio data playback processor 980, and transmitted to another mobile phone via the RF circuit 910, or transmitted to the memory 920 for further processing.

WiFi is a short-range wireless transmission technology, and the mobile phone can help users to transmit and receive emails, browse web pages, and access streaming media through the WiFi module 970, which provides users with wireless broadband Internet access. Although FIG. 9 shows the WiFi module 970, it can be understood that the WiFi module 970 does not belong to the estransmittedial configuration of the mobile phone, and can be omitted as needed within the scope without changing the essence of the invention.

The processor 980 is the control center of the mobile phone, which connects various portions of the entire mobile phone using various interfaces and lines, and implement various functions and processing data of the mobile phone by executing or executing software programs and/or modules stored in the memory 920, and invoking data stored in the memory 920, so as to perform overall monitoring of the mobile phone. Optionally, the processor 980 may include one or more processing units. Preferably, the processor 980 may integrate an application processor and a modem processor, where the application processor mainly processes an operating system, a user interface, an application, and the like; and the modem processor primarily handles wireless communications. It will be appreciated that the above described modem processor may also not be integrated into the processor 980.

The mobile phone also includes a power supply 990 (such as a battery) that supplies power to the various components. Preferably, the power supply can be logically coupled to the processor 980 through a power management system to manage functions such as charging, discharging, and power management through the power management system.

Although not shown, the mobile phone may further include a camera, a Bluetooth module, and the like, and details are not described herein.

In the foregoing implementation shown in FIG. 2 to FIG. 4A, the processes on the terminal side in each method implementation may be implemented based on the structure of the mobile phone.

In the foregoing implementation shown in FIG. 5 and FIG. 6, each unit function can be implemented based on the structure of the mobile phone.

The implementation of the disclosure further provides a computer readable storage medium, wherein the computer readable storage medium stores a computer program for electronic data exchange, wherein the computer program causes the computer to implement some or all of the steps described in the above method implementation and related to the terminal.

The implementation of the disclosure further provides a computer readable storage medium, wherein the computer readable storage medium stores a computer program for electronic data exchange, wherein the computer program causes the computer to implement some or all of the steps described in the above method implementation and related to the network device.

The implementation of the disclosure further provides a computer program product, wherein the computer program product includes a non-transitory computer readable storage medium storing a computer program, the computer program being operative to cause a computer to implement some or all of the steps described in the above method implementation and related to the terminal. The computer program product may be a software installation package.

The implementation of the disclosure further provides a computer program product, wherein the computer program product includes a non-transitory computer readable storage medium storing a computer program, the computer program being operative to cause a computer to implement some or all of the steps described in the above method implementation and related to the network device. The computer program product may be a software installation package.

The steps of the method or algorithm described in the implementation of the disclosure may be implemented in a hardware manner, or may be implemented by a processor executing software instructions. The software instructions may be composed of corresponding software modules, which may be stored in a random access memory (RAM), a flash memory, a read only memory (ROM), an erasable programmable read only memory (EPROM), an electrically erasable programmable read only memory (EEPROM), registers, hard disk, removable hard disk, compact disk read only (CD-ROM) or any other form of storage medium known in the art. An exemplary storage medium is coupled to the processor to enable the processor to read information from, and write information to, the storage medium. Optionally, the storage medium can also be an integral part of the processor. The processor and the storage medium can be located in an ASIC. Additionally, the ASIC can be located in an access network device, a target network device, or a core network device. Optionally, the processor and the storage medium may also exist as discrete components in the access network device, the target network device, or the core network device.

Those skilled in the art should appreciate that, in one or more of the above examples, the functions described in the implementation of the disclosure may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions described in accordance with implementation of the disclosure are generated in whole or in part. The computer can be a general purpose computer, a special purpose computer, a computer network, or other programmable device. The computer instructions can be stored in a computer readable storage medium or transferred from one computer readable storage medium to another computer readable storage medium. For example, the computer instructions can be transmitted from a website site, a computer, a server or a data center to another website site, another computer, another server, or another data center in wired manner (e.g., coaxial cable, fiber optic, digital subscriber line (DSL)) or in wireless manner (e.g., infrared, wireless, microwave, etc.). The computer readable storage medium can be any available medium that can be accessed by a computer or a data storage device such as a server, data center, or the like that includes one or more available media. The available medium may be a magnetic medium (e.g., a floppy disk, a hard disk, a magnetic tape), an optical medium (e.g., a digital video disc (DVD)), a semiconductor medium (e.g., a solid state disk (SSD)), or the like.

The specific implementation of the disclosure have been described in detail with reference to the objects, technical solutions and advantages of the implementation of the disclosure. It should be understood that the foregoing description is only related to implementation of the disclosure, rather than limiting the scope of the disclosure. Any modifications, equivalents, improvements, and the like, which are made based on the implementation of the disclosure, are covered within the protection scope of the implementation of the disclosure.

What is claimed is:

1. A method for transmitting information, comprising:
receiving, by a terminal, a first downlink control information (DCD, the first DCI being used for scheduling the terminal to transmit uplink data through a physical uplink shared channel (PUSCH) in a target time unit;
receiving, by the terminal, a second DCI, feedback response information of the second DCI being transmitted in the target time unit, and transmission time of the second DCI being before the target time unit or the same as the target time unit;
determining, by the terminal, a time interval between the transmission time of the second DCI and the target time unit or between the transmission time of the second DCI and a starting position of the PUSCH;
determining, by the terminal, that the time interval is not less than a preset time interval, performing rate matching on the uplink data scheduled by the first DCI according to a number of bits of the feedback response information of the second DCI or at least one resource occupied by the feedback response information of the second DCI, and
transmitting, by the terminal through the PUSCH, the feedback response information of the second DCI and the uplink data being rate matched.

2. The method according to claim 1, wherein the second DCI comprises a plurality of DCIs, each DCI having feedback response information.

3. The method according to claim 1, wherein the method further comprises:

transmitting, by the terminal, the preset time interval to a network device; or
transmitting, by the terminal, information of terminal capability to the network device, the information of terminal capability comprises the preset time interval.

4. The method according to claim 1, wherein a value of the preset time interval is determined by a preset protocol or by a configuration of the network device.

5. A method for transmitting information, comprising:
transmitting, by a network device, a first downlink control information (DCI), the first DCI being used for scheduling a terminal to transmit uplink data through a physical uplink shared channel (PUSCH) in a target time unit;
transmitting, by the network device, a second DCI, feedback response information of the second DCI being transmitted in the target time unit, and transmission time of the second DCI being before the target time unit or the same as the target time unit;
determining, by the network device, a time interval between the transmission ti me of the second DCI and the target time unit or between the transmission time of the second DCI and a starting position of the PUSCH;
determining, by the network device, that the time interval is not less than a preset time interval, performing rate de-matching on the uplink data scheduled by the first DCI according to a number of bits of the feedback response information of the second DCI or at least one resource occupied by the feedback response information of the second DCI, and
demodulating, by the network device, the uplink data and the feedback response information of the second DCI.

6. The method according to claim 5, wherein the second DCI comprises a plurality of DCIs, each DCI having feedback response information.

7. The method according to claim 5, wherein the method further comprises:
receiving, by the network device, the preset time interval from the terminal; or
receiving, by the network device, information of terminal capability from the terminal, the information of terminal capability comprises the preset time interval.

8. A terminal, comprising: a processor, a memory, a communication interface, and one or more programs, the one or more programs being stored in the memory and configured to be executed by the processor, wherein the one or more programs comprise instructions used for performing actions comprising:
receiving, by a terminal, a first downlink control information (DCD, the first DCI being used for scheduling the terminal to transmit uplink data through a physical uplink shared channel (PUSCH) in a target time unit;
receiving, by the terminal, a second DCI, feedback response information of the second DCI being transmitted in the target time unit, and transmission time of the second DCI being before the target time unit or the same as the target time unit;
determining, by the terminal, a time interval between the transmission time of the second DCI and the target time unit or between the transmission time of the second DCI and a starting position of the PUSCH;
determining, by the terminal, that the time interval is not less than a preset time interval, performing rate matching on the uplink data scheduled by the first DCI according to a number of bits of the feedback response information of the second DCI or at least one resource occupied by the feedback response information of the second DCI, and transmitting, by the terminal through the PUSCH, the feedback response information of the second DCI and the uplink data being rate matched.

9. The terminal according to claim 8, wherein the second DCI comprises a plurality of DCIs, each DCI having feedback response information.

10. The terminal according to claim 8, wherein the method further comprises:

transmitting, by the terminal, the preset time interval to a network device; or transmitting, by the terminal, information of terminal capability to the network device, the information of terminal capability comprises the preset time interval.

11. The terminal according to claim 8, wherein a value of the preset time interval is determined by a preset protocol or by a configuration of the network device.

* * * * *